United States Patent

[11] 3,593,827

[72] Inventor Nils Borje Lennart Sander
    Malmo, Sweden
[21] Appl. No 811,942
[22] Filed Apr. 1, 1969
[45] Patented July 20, 1971
[73] Assignee Svenska Aktiebolaget Bromsregulator
    Malmo, Sweden
[32] Priority Apr. 2, 1968
[33] Great Britain
[31] 15897/68

[54] RAILWAY VEHICLE BRAKE RIGGING AND ADJUSTING MEANS
3 Claims, 2 Drawing Figs.
[52] U.S. Cl. .................................................... 188/203, 188/196
[51] Int. Cl. ....................................................... F16d 65/66
[50] Field of Search ............................................. 188/196 B, 196 BA, 198—203, 196 P

[56] References Cited
UNITED STATES PATENTS
| | | | |
|---|---|---|---|
| 1,898,549 | 2/1933 | Clair et al. | 188/198 (GT) X |
| 1,933,094 | 10/1933 | Camp | 188/200 (GT) |
| 2,225,001 | 12/1940 | Browall | 188/196 (FRR) |
| 3,404,759 | 10/1968 | Natschke et al. | 188/196 (PRR) X |

Primary Examiner—George E. A. Halvosa
Attorney—Laurence R. Brown

ABSTRACT: A railway brake rigging has a live brake lever moved by a piston and a dead brake lever pivoted on a fixed position relative to the bogie frame through a linkage coupled to the live brake lever. The fixed position is a movable slack adjuster spindle with a mechanism operable through a linkage to the piston to rotate a nut between two clutch surfaces so that the spindle moves axially to take up or release slack in the rigging.

PATENTED JUL 20 1971

3,593,827

INVENTOR

Nils B. L. Sander

BY Laurence R. Brown
ATTORNEY

RAILWAY VEHICLE BRAKE RIGGING AND ADJUSTING MEANS

This invention relates to a railway vehicle brake rigging of the kind comprising an automatic axially acting two-way slack-adjuster.

The invention is intended to provide an improved brake rigging of the kind referred to which is simple in design and manufacture and reliable in use.

According to the invention there is provided a railway vehicle brake rigging comprising a live brake lever having a dead brake lever linked thereto and operated by an axially moved piston movably connected with the live brake lever. An automatic axially acting two-way slack-adjuster is disposed along the piston axis and is connected with the piston. It includes an axially movable screw-threaded spindle carrying a rotatable nut, the threads of the spindle and the nut being such that they are non-self-locking and the nut serving to terminate axial motion of the spindle in either direction by engaging the respective one of two stationary clutch surfaces between which the nut is disposed. A movable abutment provided therewith is capable of axially locating the nut so that the nut can rotate when the spindle moves axially. The movable abutment is connected to the live brake lever and is movable along said axis with the piston. The dead brake lever is pivotally connected to the spindle, ans is so arranged that the slack in the rigging is automatically adjusted to maintain it within predetermined limits.

Figure 1:
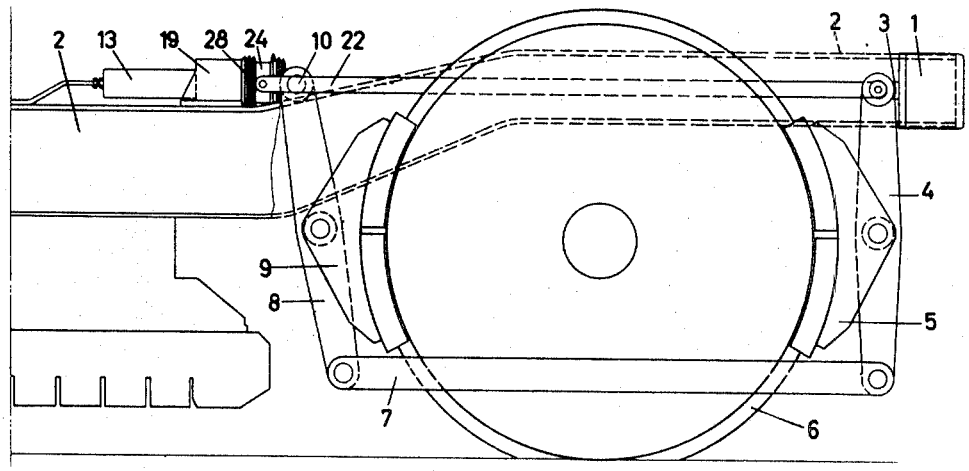
Figure 2:
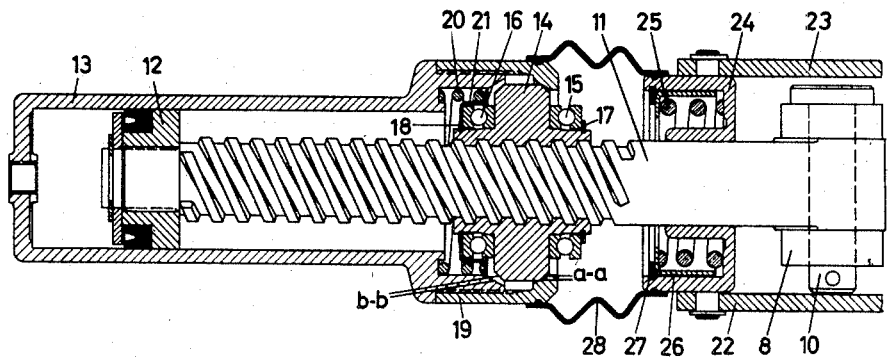

The invention is further defined in the appended claims and an example of construction is described below with reference to the accompanying drawing, in which FIG. 1 schematically shows a side view of a preferred brake rigging according to the invention, and FIG. 2 is a view in horizontal section showing the slack-adjuster part of the rigging in FIG. 1 to a larger scale.

The illustrated rigging comprises a cylinder-and-piston unit including a pneumatic brake cylinder 1 rigidly secured to the frame 2 of a railway vehicle bogie. A piston rod 3 axially movable in the cylinder 1 is pivotally connected to a live brake lever 4, which is moved directly by the piston and carries a brakeshoe 5 adapted to engage a wheel rim 6. The lower end of the live brake lever 4 is pivotally connected to a link 7 which in turn is pivotally connected to the lower end of a dead brake lever 8 carrying a brakeshoe 9, which lever is not moved directly by the piston 3 but by means of linkage 4, 7. At its upper end the dead brake lever 8 is pivoted at 10 to a spindle 11 of an automatic slack-adjuster as further described below, but for the purposes of description of the operation of the brakes initially the pivot 10 may be regarded as stationary relative to the bogie frame 2.

Assuming that the pivot 10 remains stationary, the brake rigging as so far described operates as follows:

In order to effect braking the air pressure in the cylinder 1 is varied to create a force tending to drive the piston rod 3 out from the brake cylinder 1. The brakeshoe 5 engages the rim 6, the live brake lever 4 turns counterclockwise as viewed in FIG. 1, and a tension force is transmitted through the link 7 so that the dead brake lever 8 turns counterclockwise around the pivot 10 and the brakeshoe 9 engages the rim 6.

If the brake surfaces of the rim 6 and the brakeshoes 8 and 9 become worn the piston rod 3 would have to travel through a correspondingly longer distance, but it will be understood that a displacement of the pivot 10 towards the right would wholly or partially counteract any need for a longer stroke of the piston rod 3. The slack-adjuster part of the rigging automatically effects such a displacement of the pivot 10 and is described below with reference to FIG. 2 of the drawing.

Referring now to FIG. 2, the dead brake lever 8 is pivoted at 10 to the spindle 11 and the latter is rigidly connected to a piston 12 working in a pneumatic cylinder 13. The spindle 11 is provided with screw threads and carries a rotatable nut 14, the threads having such pitch as to be non-self-locking. The end of the nut 14 which is directed towards the dead brake lever 8 is herein called the front end and is provided with a front ball bearing 15 of the axial type. A rear ball bearing 16 of the axial type is provided at the rear end of the nut 14. The bearings 15 and 16 are retained by locking rings 17 and 18 respectively. A sleeve 19 is screw-threaded and secured on the cylinder 13 and is provided with a stationary clutch surface adapted to engage a front clutch surface of the nut 14 so as to form a front friction clutch a–a. A rear clutch surface on the nut 14 is adapted to engage a rear stationary clutch surface on the cylinder 13 to form a rear clutch b–b. A helical compression spring 20 is prestressed and held between a shoulder surface on the cylinder 13 and a sleeve 21 engaging a rear surface on the rear bearing 16.

Two link bars 22 and 23 are pivoted to the piston rod 3 and to the live brake lever 4—see FIG. 1—and thus their left-hand ends—shown in FIG. 2—move in correspondence with the movements of the piston rod 3 relative to the stationary cylinder 13. The bars 22 and 23 are pivotally connected to a sleeve 24 which is axially movable on the spindle 11. The sleeve 24 contains a prestressed helical compression spring 25 which is clamped between a rear shoulder of the sleeve 24 and a relatively movable flanged sleeve 26 retained by a locking ring 27. The flanged sleeve 26 constitutes a movable abutment capable of axially locating the nut 14 so that the nut 14 can rotate, as further described below. The piston 12 is movable in the cylinder 13 by fluid pressure for applying axial force to the spindle 11 in opposition to axial force exerted on the spindle 11 by the dead brake lever 8 during braking. A protective elastic cover 28 prevents entrance of dirt between the sleeve 24 and the cylinder 13.

The illustrated slack-adjuster part of the rigging operates as follows:

Compressed air is fed to the space limited by the cylinder 13 and the rear surface of the piston 12. Thus the spindle 11 is forced forwardly—i.e. towards the right in FIG. 2—and the clutch a–a is engaged. The pivot 10 is thus stationary relative to the cylinder 13 and the bogie frame 2. As soon as the braking force causes the axial force which is transmitted to the spindle 11 via the pivot 10 to exceed the force due to the compressed air in the cylinder 13 the spindle 11 will be displaced rearwardly. Thus the clutch a–a will open and the clutch b–b will be engaged.

Now if the slack in the transmission is normal the link bars 22 and 23 will have moved so far rearwardly that the sleeve 26 will have contacted the front ball bearing 15 at the moment the clutch a–a is disengaged. Thus the nut 14 will not be moved relative to the spindle 11 by either of the springs 20 and 25 during its movement until the clutch b–b is engaged. As no rotation of the nut 14 occurs there is no adjustment of the slack in the brake rigging.

However, if the slack in the rigging or the spaces between the brakeshoes 5 and 9 and the wheel rim 6 have become too large—e.g. because of wear—the sleeve 26 will contact the front ball bearing 15 during a brake application prior to the moment at which a substantial braking force has been established and at which the clutch a–a is about to become disengaged. Therefore the clutch a–a will be disengaged by the force transmitted through the bars 22 and 23 only—the said force acting through the sleeve 26 and the spring 25 and the sleeve 24. As soon as the clutch a–a is disengaged the spindle 11 is moved axially forwardly (i.e. toward the right in FIG. 2) while the nut 14 is rotating on the spindle 11, the nut 14 being axially located by the flanged sleeve 26 engaging the bearing 15 so that both the clutches a–a and b–b are disengaged and the nut 14 can rotate whilst the spindle 11 moves axially. This movement is continued until the braking force is such that the force transmitted to the spindle 11 through the pivot 10 is sufficient to move the piston 12 and spindle 11 rearwardly together with the nut 14 until the clutch b–b is engaged. The axial movement of the piston 12 and spindle 11 in the forward direction which has already occurred, however, exceeds the rearward motion and will cause a decrease in the slack in the brake rigging.

If, however, during a brake application the slack in the rigging should be too small—e.g. after fitting a new brakeshoe in replacement of a wornout brakeshoe—the axial force transmitted to the spindle 11 through the pivot 10 will exceed the force due to the compressed air behind the piston 12 prior to any contact between the sleeve 26 and the front ball bearing 15. Now the clutch a-a will be disengaged and the spindle 11 will be moved axially rearwardly while the nut 14 is rotating on the spindle 11, the nut 14 being pressed by the spring 20 acting through the sleeve 18 and the rear bearing 16 so that the clutch b-b remains disengaged during this movement. This rearward movement will continue until the sleeve 26 acting through the front ball bearing 15 pushes the nut 14 rearwardly against the action of the spring 20 until the clutch b-b is engaged and thereby stops the rotating of the nut 14. The rearward movement of the spindle 11 will thus have caused the desired increase in the slack in the rigging.

From the above description it will be appreciated that the slack in the rigging is automatically adjusted to maintain it within predetermined limits, and that the live brake lever 4 is actuated by a cylinder-and-piston unit 1 and the movable abutment constituted by the sleeve 26 is connected to the live brake lever 4 so that the movable abutment travels axially in dependence upon the piston stroke of the cylinder-and-piston unit. The screw-threaded spindle 11 is mounted to act as the piston rod of a piston 12 movable in a cylinder 13 by fluid pressure for applying axial force to the spindle 11 in opposition to axial force exerted on the spindle 11 by the dead brake lever 8 during braking. The movable abutment constituted by the sleeve 26 is connected to the live brake lever 4 through connection means including a prestressed spring 25 and capable of yielding to allow for some contingent further motion of the live brake lever 4 if during braking the movable abutment has pressed the nut 14 into engagement with the rear one of the stationary clutch surfaces.

The nut 14 is continuously loaded by the prestressed spring 20 towards the sleeve 26.

I claim:

1. A railway vehicle brake rigging on a railroad bogie comprising in combination, a movable member for applying the brakes, a live brake lever coupled to a first brake shoe pivotable with movement of said member, a dead brake lever linked to the live brake lever and coupled to a second brakeshoe, a pivot point in said dead brake lever substantially fixed relative to said bogie, and an automatic slack adjuster affixed to said bogie with an axial spindle containing said pivot point, wherein the slack adjuster comprises non-self-locking screw threads on the spindle carrying a rotatable nut, two stationary clutch surfaces disposed to engage said nut to terminate axial motion of the spindle in either direction, a movable abutment axially moved with said live brake lever to engage the nut and locate it axially on said spindle by rotation to move the spindle axially with respect thereto and carrying therewith the dead brake lever pivot point to automatically adjust the slack in the rigging to maintain it within predetermined limits wherein the movable member actuating the live brake lever is a cylinder-and-piston unit and the movable abutment is connected to the live brake so that the movable abutment travels axially in dependence upon the piston stroke of the cylinder-and-piston unit, biasing means applying a predetermined axial force to said spindle in opposition to the axial force exerted on the spindle by said dead brake lever during a braking operation operable to cause the slack adjuster spindle and the dead lever pivot point to move axially in the braking direction when said force is overcome, mounting means disposing one of said two clutch surfaces so that it is disengaged before a substantial braking force has been established if the slack becomes too great and thereby permits said rotatable nut to rotate in one direction on said spindle and take up the excess slack, and mounting means operable when the slack becomes too small and the dead brake lever transmits to said spindle a force exceeding that of said biasing means to permit the nut to rotate in the opposite direction on said spindle to increase the slack in said system before engagement of said movable abutment with said nut.

2. A brake rigging according to claim 1, wherein the movable abutment is connected to the live brake lever through connection means including a prestressed spring and capable of yielding to allow for some contingent further motion of the live brake lever if during braking the movable abutment has pressed the nut into engagement with one of the stationary clutch surfaces.

3. A brake rigging according to claim 1, wherein biasing means comprises structure whereby the screw-threaded spindle is mounted to act as the piston rod of a piston movable in a cylinder by fluid pressure for applying axial force to the spindle in opposition to axial force exerted on the spindle by the dead brake lever during braking.